United States Patent [19]

Kozikaro

[11] Patent Number: 5,058,023

[45] Date of Patent: Oct. 15, 1991

[54] VEHICLE POSITION DETERMINING APPARATUS

[75] Inventor: Elisha M. Kozikaro, Chicago, Ill.

[73] Assignee: Motorola, Inc., Schaumburg, Ill.

[21] Appl. No.: 559,814

[22] Filed: Jul. 30, 1990

[51] Int. Cl.$^5$ .............................................. G06F 15/50
[52] U.S. Cl. .................................. 364/450; 364/449; 364/457; 340/988; 33/356
[58] Field of Search ............... 364/443, 444, 449, 453, 364/454, 457, 450; 33/356, 357; 73/178 R; 340/988, 990; 342/450, 451

[56] References Cited

U.S. PATENT DOCUMENTS

| | | | |
|---|---|---|---|
| 4,492,352 | 1/1985 | Yueh | 244/3.15 |
| 4,555,761 | 11/1985 | Matsumoto et al. | 364/449 |
| 4,734,863 | 3/1988 | Honey et al. | 364/449 |
| 4,758,959 | 7/1988 | Thoone et al. | 364/449 |
| 4,791,574 | 12/1988 | Thoone et al. | 364/457 |
| 4,812,990 | 3/1989 | Adams et al. | 364/444 |
| 4,831,563 | 5/1989 | Ando et al. | 33/356 |
| 4,862,398 | 8/1989 | Shimizu et al. | 33/356 |
| 4,890,233 | 12/1989 | Ando et al. | 364/457 |

OTHER PUBLICATIONS

*Philips Technical Review,* "Carin, A Car Information and Navigation System", vol. 43, No. 11/12, Dec. 1987.
"Transportation for the Future, Automobile Navigation Technology: Where Is It Going?", Robert L. French, May 24-25, 1988.

*Primary Examiner*—Gary Chin
*Attorney, Agent, or Firm*—Phillip H. Melamed

[57] ABSTRACT

Vehicle position determining apparatus (10) uses dead reckoning to calculate new vehicle position and heading (A2, H2) based on prior position and heading (A1, H1). Computer (11) separately calculates heading changes ($\Delta H_{od}$, $\Delta H_c$) as measured by a pair of differential wheel sensors (16, 17) and a magnetic compass (15) and uses these heading changes to calculate assoicated lateral accelerations of the vehicle ($LA_{od}$, $LA_c$) over a time and/or distance interval ($\Delta t$, $\Delta d$). If calculated lateral acceleration, or rate of vehicle turn, exceeds a maximum predetermined limit value, and this is therefore indicative of unstable or improbable vehicle operation, heading change data which resulted in calculation of excessive lateral acceleration is probably erroneous and will not be substantially utilized to calculate new vehicle position and heading.

20 Claims, 2 Drawing Sheets

100

VEHICLE POSITION DETERMINING APPARATUS

FIELD OF THE INVENTION

The present invention relates to the field of vehicle position determining apparatus, and in particular to such apparatus in which changes in vehicle position and/or heading are sensed and utilized to determined a new vehicle position.

BACKGROUND OF THE INVENTION

Prior vehicle position determining systems are known in which sensors on the vehicle are utilized to determine vehicle position and heading based on sensed distance traveled and sensed changes in vehicle heading. In such systems, which are generally designated as dead reckoning position systems, the initial vehicle position is determined either by the vehicle operator directly entering such information into a computer, or through the utilization of a Loran or GPS (global positioning system) vehicle location system or by using the vehicle's previously calculated position. The initial vehicle heading is determined by either an electronic or magnetic compass or by using the vehicle's previously calculated heading. Then, the distance traveled by the vehicle and the change in vehicle heading are measured by vehicle mounted sensors and the new vehicle position is determined by measuring these changes over a predetermined time or distance interval, effectively creating a distance and heading change vector and adding this change vector to the initial vehicle position and heading to arrive at a new vehicle position and heading. In some prior systems, the new position calculated by these systems is then compared to map data stored in a computer and the vehicle position is corrected since the vehicle is assumed to only be able to have a location corresponding to the location of roads defined by the stored map data. The operation of systems of the above type is well known.

In some of the systems described above, the sensed distance which the vehicle travels is determined by wheel sensors which measure the wheel speed or revolutions of the wheel. Sometimes, two wheel sensors are utilized and the average of these wheel sensors is utilized to determined vehicle distance traveled. In addition, the difference between wheel revolutions or wheel speed can be utilized to determine changes in vehicle heading. Changes in magnetic compass readings may also be utilized, along with such two wheel sensors, to determine changes in vehicle heading. Systems which operate in accordance with the above stated principals are subject to errors which may not be readily correctable just by comparing the calculated new vehicle position and heading with allowable vehicle positions and headings based on stored roadway map data. Such errors in calculated vehicle position and heading can occur, for example, when during vehicle travel a bump in the road is encountered. This bump may cause a substantial difference between the revolutions of the two wheels which are sensed to determine distance traveled and changes in vehicle heading. Applying the brakes of the vehicle when the vehicle goes over a bump can magnify this difference error, especially if one of the sensed wheels becomes airborne whereas the other sensed wheel does not.

Some prior navigation systems and/or vehicle position determining systems discuss providing a signal indicative of actual sensed lateral acceleration of the vehicle. This lateral acceleration is then utilized, in combination with sensed vehicle speed, to determine the distance and heading change vector to be utilized in determining vehicle position. However, the lateral acceleration is not utilized to correct for erroneous sensor readings, and in fact appears to be subject to such erroneous sensor readings. In some navigation systems, such as for guided missiles, the route to be selected for the vehicle may take into account the maximum lateral acceleration or operating capabilities of the vehicle. However, clearly this has nothing to do with correcting errors in a vehicle position determining apparatus which calculates a vehicle new position based on its old position and heading and based on changes in distance traveled and sensed changes in vehicle heading.

OBJECTS OF THE PRESENT INVENTION

An object of the present invention is to provide an improved vehicle position determining apparatus which utilizes sensed vehicle distance traveled and sensed changes in vehicle heading but is less subject to sensing errors.

A more particular object of the present invention is to provide an improved vehicle position determining apparatus in which two wheels are sensed to determine distance traveled and/or changes in vehicle heading and in which errors in calculated new vehicle position and heading are minimized in the event of gross errors in the sensing of the travel of the two wheels.

BRIEF DESCRIPTION OF DRAWINGS

The present invention can be better understood by reference to the drawings, in which.

DESCRIPTION OF THE PREFERRED EMBODIMENTS

Figure 1:
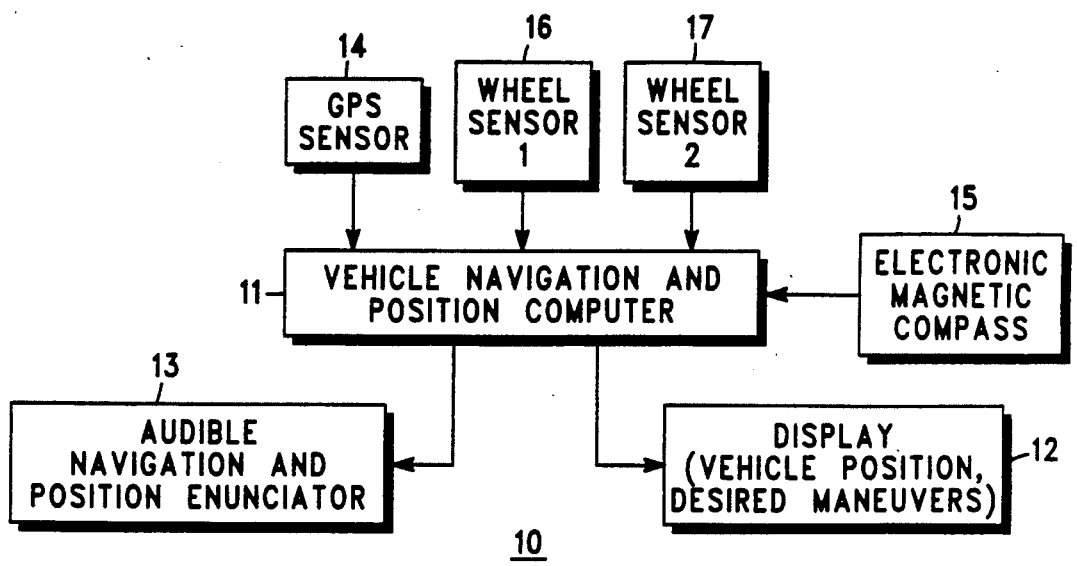
FIG. 1 is a schematic diagram of a vehicle position determining apparatus constructed in accordance with the present invention.

Referring to FIG. 1, a dead reckoning vehicle position determining apparatus 10 is illustrated. The apparatus includes a vehicle navigation and position computer 11 which receives various vehicle sensor inputs, calculates new vehicle position based on these sensor inputs and the vehicle's prior position and, if desired, provides navigation information to the vehicle operator by virtue of a visual display 12 and/or an audible navigation/position enunciator 13. The entire system 10 is intended for mounting on a vehicle (not shown) whose position is to be determined and for which a vehicle navigation path is to be selected. Preferably the vehicle is a land vehicle and the navigation path consists of selecting various roadways for implementing travel of the vehicle between an initial position and a destination position. Initial vehicle position is provided through the use of a global positioning system (GPS) sensor 14. Alternatively, the operator of the vehicle may manually enter the vehicle's known position at the start of a trip or the computer 11 can use the vehicle's prior calculated position. For navigation systems, the operator of the vehicle will enter the vehicle's desired destination into the computer 11. The initial heading direction of the vehicle is provided by an electronic magnetic compass 15 which provides heading direction information to the computer 11. In addition, first and second wheel sensors 16 and 17 are provided on the vehicle and sense the travel of two different wheels of the vehicle. The difference between wheel travel for the two wheels over a predetermined time or distance interval is also utilized to determine changes in vehicle directional heading while the elapsed distance of vehicle travel measured by the wheel sensors 16 and 17 is used to determine the magnitude of vehicle distance traveled.

Figure 2:
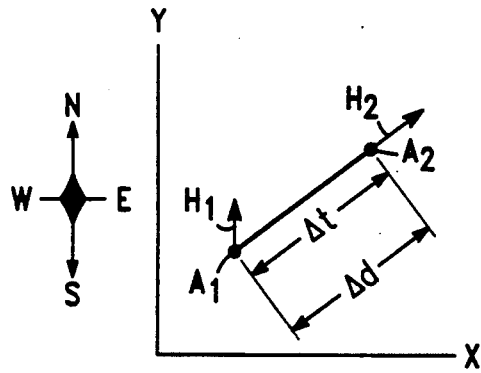
FIG. 2 is a graph illustrating how the present position determining apparatus effectively adds a change vector to a vehicle's initial position and heading to determine a vehicle's new position and heading.

Systems similar to that of the present invention which use the same general components shown in FIG. 1 are known. These systems essentially function by determining a vehicle's initial position and heading through some method. Then the vehicle's new position is calculated. FIG. 2 illustrates a vehicle initial position and heading designated by the location of dot $A_1$ and the arrow $H_1$, respectively. Subsequently, after the passage of either a predetermined time period $\Delta t$ or the passage of a predetermined elapsed distance $\Delta d$ as measured by the wheel sensors 16 and 17, a new vehicle position is arrived at. In FIG. 2, this new vehicle position is indicated by the dot $A_2$, and the new vehicle heading at this position is indicated by the arrow $H_2$. It is clear that by measuring elapsed distance and changes in heading direction, any computer can start with the $A_1$ and $H_1$ data and effectively add a change vector to it to arrive at the new calculated $A_2$ and $H_2$ data. This function has been implemented in essentially all prior dead reckoning systems.

Figure 3:
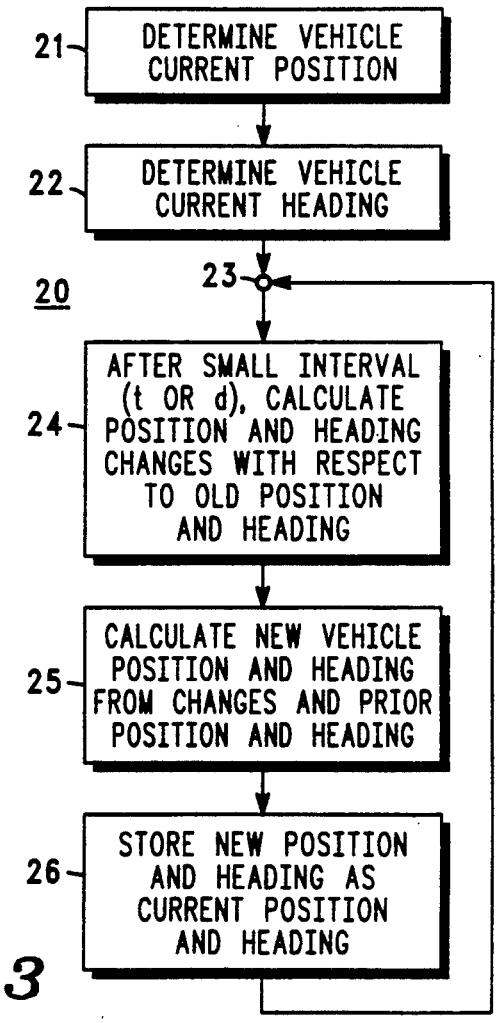
FIG. 3 is a flowchart illustrating the general operation of the apparatus shown in FIG. 1.

Referring to FIG. 3, a general flowchart 20 of a dead reckoning system is illustrated wherein this general flowchart applies not only to the improved vehicle position determining apparatus 10 in FIG. 1, but also to prior dead reckoning systems. The computer 11 is programmed to implement the flowchart 20 in FIG. 3. In FIG. 3, at initial process steps 21 and 22 the vehicle's current position and current heading are determined. As noted above, this can be provided by the GPS sensor 14 and electronic magnetic compass 15, or the data may be manually entered by the vehicle operator or these current values can be the result of previous calculations of the vehicle navigation and position computer 11. In any event, after the process steps 21 and 22, control passes to a terminal 23. From that point, control passes to a process block 24 in which changes in vehicle position and changes in vehicle heading, with respect to the previous vehicle position and heading, are calculated after a small interval. This interval can be either an interval of fixed small time or an interval of fixed elapsed distance. A small interval is desired to maintain accuracy of the position determining apparatus 10. Typical time intervals ($\Delta t$) would be on the order of a half a second for each interval and typical distance intervals ($\Delta d$) would be on the order of 2.5 to 5 meters. Thus, process block 24 determines the change in position and the change in heading direction which occurs over a time interval $\Delta t$ which represents either the elapsing of a fixed period of time or the traveling of the vehicle over a fixed distance $\Delta d$.

After block 24, control then passes to a process block 25 which essentially calculates the new vehicle position and heading $A_2$ and $H_2$ based on these changes and the prior vehicle position represented by the data $A_1$ and $H_1$. As noted above, this can be viewed as effectively adding a change vector in position and heading to the vehicle's initial position. Control passes from the process block 25 to a process block 26 that then stores this new calculated position and heading for the vehicle as the current position and heading for the vehicle. Control then passes back to the terminal 23 wherein the processes 24 through 26 are executed in sequence again.

Figure 4:
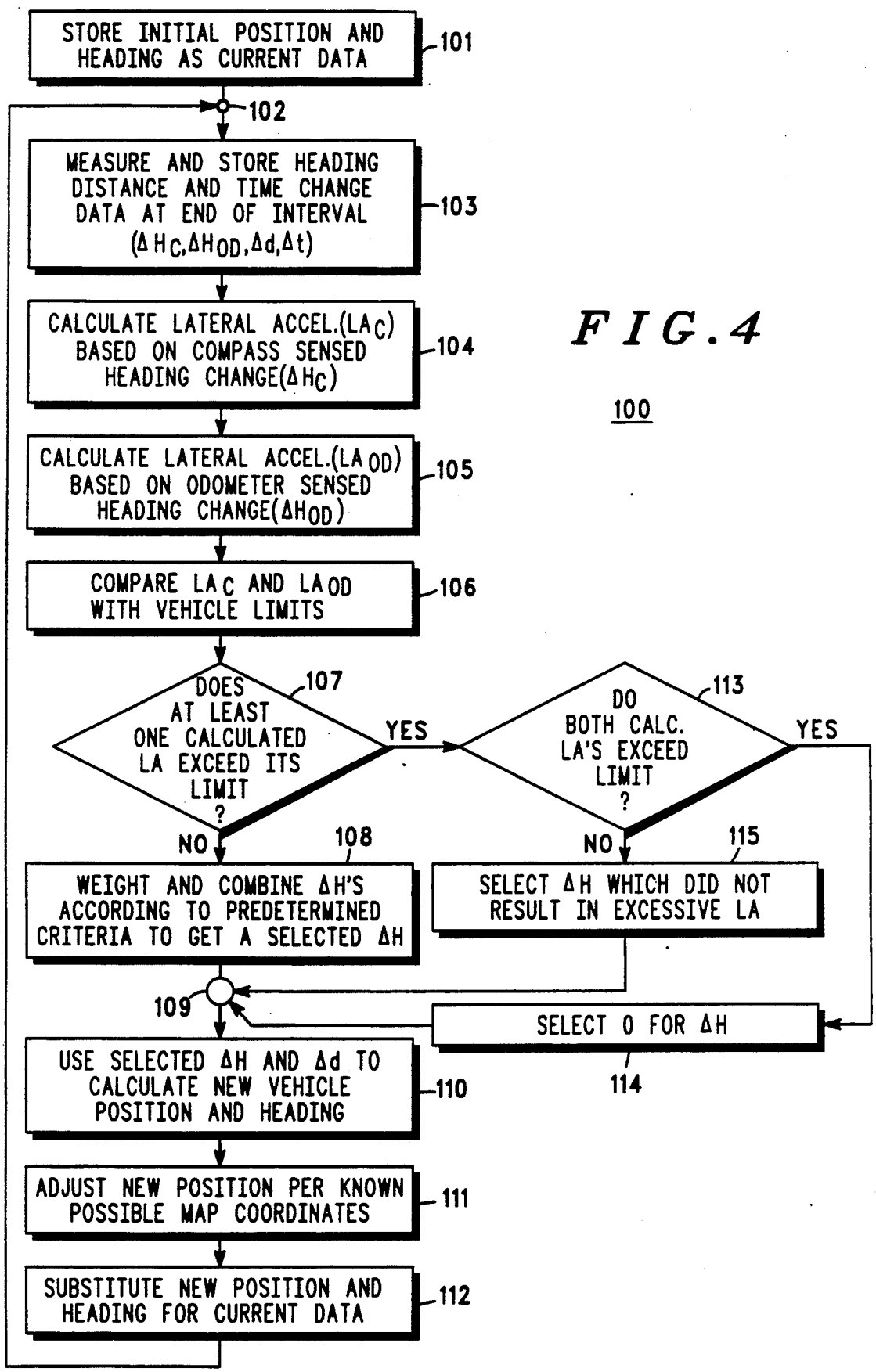
FIG. 4 comprises a flowchart which illustrates in detail the operation of the apparatus in FIG. 1 and how the present invention minimizes errors in calculated position and heading attributable to substantial errors in sensed vehicle parameters.

The flowchart 20 in FIG. 3 is representative of the operation of many prior dead reckoning systems, especially those used in land based vehicle navigation systems such as the Philips CARIN Navigation System or other similar systems. The present invention represents an improvement to such systems in that it can recognize gross sensor errors which can result in erroneous readings for the changes in position, and especially changes in heading, which are measured by such a system. Some prior systems have recognized that they are subject to errors in sensing heading changes. These systems may utilize both the wheel sensors 16 and 17 and the electronic magnetic compass 15 to sense heading changes. The heading changes which are independently calculated based on the wheel sensors and the magnetic compass are then separately weighted and combined together to give a composite vehicle heading change result. However, such systems typically merely subject the wheel speed sensing heading change information to a high pass filter and the electronic compass heading change information to a low pass filter, since errors from the wheel sensors 16 and 17 are presumed to be low frequency type errors whereas errors from the electronic magnetic compass 15 are presumed to be high frequency errors. However, this is not always the case since as the vehicle encounters road bumps high frequency transient errors can readily occur with respect to the wheel sensors 16 and 17. Such prior weighting systems, such as shown in U.S. Pat. No. 4,791,574, may then misinterpret these high frequency wheel sensing errors as proper data and provide an erroneous vehicle position and vehicle heading calculated result. The present invention minimizes this possibility since it implements a flowchart 100 shown in detail in FIG. 4.

The flowchart 100 represents the operation of the programmed vehicle navigation and position computer 11 of the system 10 which implements the operation of the present invention. The flowchart commences at a process block 101 in which initial vehicle position and heading data is stored as "current vehicle data". This essentially just represents storing in the computer 11 the initial vehicle position $A_1$ and the heading $H_1$. Control then passes to a terminal 102. From there, control passes to a process block 103 which measures and stores the changes in heading, distance and time which occur at the end of a predetermined interval wherein this interval can be the elapsing of a fixed time period or the traveling of a predetermined distance by the vehicle. Thus process block 103 represents the storing of the time $\Delta t$ which elapsed during this interval, the vehicle distance $\Delta d$ traveled during this interval and the change in heading which was measured during this interval. In block 103 separate heading change data is determined for the change as measured by the changes in the magnetic compass and the change as measured by the difference in wheel travel measured by the wheel sensors 16 and 17. The measured heading change based on changes in compass direction is designated as $\Delta H_c$ and the measured heading change based on the difference in wheel travel is designated by $\Delta H_{od}$ wherein the $_{od}$ subscript stands for the abbreviation of odometer. It should be noted that the vehicle distance $\Delta d$ traveled during the interval, is calculated by averaging the wheel distance travel sensed by each of the wheel sensors 16 and 17. This is contrasted with respect to the change in heading direction which is a function of the difference between the wheel travel sensed by sensors 16 and 17.

After the process block 103, control passes to process block 104 which calculates lateral acceleration ($LA_c$) based on the sensed compass change heading $\Delta H_c$. Then process block 105 also calculates a lateral acceleration $LA_{od}$ based on the odometer sensed heading change information $\Delta H_{od}$. Of course the order of the process blocks 104 and 105 could be reversed or the blocks could be implemented simultaneously without effecting the operation or spirit of the present invention.

After process block 105, control passes to process block 106 which compares each of the calculated lateral accelerations $LA_c$ and $LA_{od}$ with associated vehicle lateral acceleration limits. These lateral acceleration limits represent a physical limit on the possible movement of the vehicle wherein operation of the vehicle above these lateral acceleration limits would result in unstable vehicle operation such as the overturning of the vehicle. In other words, the vehicle is only capable of movement if its actual lateral acceleration is below some predetermined limit. A feature of the present invention is using sensor data to calculate actual measured vehicle lateral acceleration. If this calculated lateral acceleration exceeds the capabilities of the vehicle, then clearly the sensor data which was used to calculate this lateral acceleration is erroneous and should be ignored or substantially discounted when determining vehicle position. The remaining portion of the flowchart 100 illustrates how the present invention utilizes the comparisons of block 106 to provide an improved position system.

While the flowchart 100 illustrates how preferably lateral acceleration based on compass or odometer wheel sensing information is calculated and compared to predetermined limits in order to determine the reliability of the compass and wheel sensing data, similar results can be obtained if rate of turn of the vehicle, rather than lateral acceleration of the vehicle, is calculated and compared with predetermined limits for the vehicle. Process blocks 104 and 105 calculate lateral acceleration essentially by calculating vehicle rate of turn by dividing the sensed heading change $\Delta H$ by the elapsed time $\Delta t$ for the interval. Then the vehicle rate of turn is multiplied by the sensed vehicle speed which is equal to $\Delta d$ divided by $\Delta t$. However, instead of block 106 comparing lateral acceleration, which varies in proportion to and as a function of vehicle rate of turn, with predetermined limits indicative of the stable operation of the vehicle, a maximum limit for the rate of turn for the vehicle can be chosen. Then actual vehicle rate of turn, calculated by dividing the sensed direction change $\Delta H$ by the elapsed time $\Delta t$, can be directly compared with limit values. Systems which compare lateral acceleration to predetermined limits and those which compare vehicle rate of change of direction to predetermined limits have both been tested and work satisfactorily. However, since lateral acceleration more readily corresponds to a physical quantity associated with stable operation of the vehicle (the maximum lateral acceleration that a vehicle can withstand and maintain stable operation), the use of calculating lateral acceleration and comparing it with a vehicle limit for lateral acceleration is preferred.

After the process block 106, control passes to a decision block 107 which essentially asks if either of calculated lateral accelerations $LA_c$ or $LA_d$ exceeds its predetermined associated limit, wherein these limits may be the same limit. If the answer is no, control passes to a process block 108 which essentially weights and combines both of the calculated heading changes $\Delta H_c$ and $H_{od}$ according to a predetermined criteria to get a selected, and in this case a composite, $\Delta H$ representative of actual vehicle heading change. In this respect, the operation of process block 108 is similar to that described in U.S. Pat. No. 4,791,574 which describes one of several ways of weighting and combining heading change information derived from different sensors. Control then passes to a terminal 109 and then onto a process block 110. The block 110 uses the selected vehicle heading change $\Delta H$ and the measured distance change $\Delta d$ to calculate new vehicle position and heading based on these quantities and the vehicle's previous position and heading. This is also similar to the operation of prior systems.

Process block 111 represents an optional process block in which the calculated position of the vehicle may now be adjusted in accordance with known possible map coordinates since the position of the vehicle is assumed to be on an actual roadway and the positions of all roadways are stored in data contained in the computer 11. Many prior systems implement this map fitting step as an additional correction to vehicle position and this does not form a significant feature of the present invention. Process block 112 then substitutes this new map fitted position and the new calculated heading as the current vehicle data and control passes back to the initial terminal 102 for reexecution of the blocks 103 et al.

What has been described above corresponds to sensing data providing realistic rate of change or lateral acceleration measured values for the vehicle. If the decision block 107 determines that at least one of the calculated lateral accelerations based on measured heading change data exceeds the maximum lateral acceleration possible for the vehicle, the obvious conclusion is that the sensed heading change data is in error and should not be substantially utilized for calculation of vehicle position and heading. In this event, control passes from the decision block 107 to a decision block 113 which determines if both calculated lateral accelerations $LA_c$ and $LA_{od}$ exceed their associated limits. If so, control passes to a process block 114 which results in selecting zero for the selected change $\Delta H$ in heading. The reason for this is that the sensor data from both the compass and the odometer (pair of wheel sensors), has resulted in calculated heading changes which are unreliable since each would imply a lateral acceleration for the vehicle which the vehicle cannot achieve. Therefore, process block 114 selects no change in heading because none of the heading change data which occurred over the time or distance interval is reliable. Thus it is presumed that there has been no change in vehicle heading. This will not lead to any appreciable error because a small interval $\Delta t$ or $\Delta d$ is utilized and because the present invention contemplates map fitting as implemented by the process block 111. In addition, periodically actual vehicle position and heading may again be determined by the GPS sensor 14 and electronic magnetic compass 15 at suitable periodic times. In the interim, rather than relying on the heading data which does not appear to be reliable, a zero change in heading is implemented by the process block 114.

If the decision block 113 determines that only one of the calculated lateral accelerations exceeded its limit, then instead of weighting, per block 108, both of the heading changes determined by the magnetic compass and the pair of wheel sensors, only the heading change which resulted in a lateral acceleration which did not exceed its associated limit will be selected as the proper heading change. This is implemented by a process block 115 which follows the decision block 113. After blocks 115 or 114 the terminal 109 is again reached. Regardless of what path is utilized to reach the terminal 109, the next step is process block 110 which results in calculating the new vehicle position based on the "selected" heading change and elapsed distance $\Delta d$.

While I have shown and described various embodiments of the present invention, further embodiments will occur to those skilled in art. One such embodiment could be the use of rate of turn of the vehicle rather than lateral acceleration and comparing such rate of turn with a predetermined limit in order to achieve a similar result. Also, in case the rate of turn or the lateral acceleration exceeds its associated limit, other various weighting factors could be utilized to combine both the erroneous and assumed to be proper heading change data. In addition, if the wheel sensors appear to provide erroneous heading change data, then there may be other corrections which are desired to be made to the distance data $\Delta d$ which is provided by the wheel sensors and is utilized to calculate the new vehicle position. All such modifications which retain the basic underlying principles disclosed and claimed herein are within the scope of this invention.

I claim:

1. Vehicle position determining apparatus comprising a dead reckoning position system including:
   differential wheel sensing apparatus for determining a sensed change in vehicle heading ($\Delta Hod$) by sensing the difference in travel between two different wheels of a vehicle;
   means for calculating a vehicle's new position and heading by using the vehicle's prior position and prior directional heading and calculating said new vehicle position and heading based on sensed distance traveled ($\Delta d$) and said sensed change in heading ($\Delta Hod$) over a time ($\Delta t$);
   means for providing vehicle navigation/position information based on said calculated new position;
   means for providing a first signal indicative of at least one of the quantities of sensed vehicle rate of turn and sensed vehicle lateral acceleration during said time by using said sensed change in heading ($\Delta Hod$),
   means for comparing said first indicative signal with a predetermined first limit value, and
   wherein said calculating means includes means for calculating said new vehicle position based on said sensed distance traveled and said sensed change in heading ($\Delta Hod$) over said time if said first indicative signal is less than said limit value, otherwise calculating said new vehicle position using a change of heading value other than said sensed change of heading ($\Delta Hod$).

2. Vehicle position determining apparatus according to claim 1 wherein said first limit value corresponds to an excessive magnitude of said first indicative signal indicative of improbable movement by said vehicle during normal operation.

3. Vehicle position determining apparatus according to claim 2 wherein said first indicative signal is indicative of said lateral acceleration of said vehicle.

4. Vehicle position determining apparatus according to claim 3 which includes a compass for sensing heading of said vehicle, and means for providing a second lateral acceleration indicative signal by using sensed changed of heading data ($\Delta Hc$) provided by said compass.

5. Vehicle position determining apparatus according to claim 4 which includes means for comparing said second lateral acceleration signal to a second limit value and means for effectively ignoring said sensed change of heading data provided by said compass or said differential wheel sensing apparatus if said change of heading data results in a corresponding one of said lateral acceleration indicative signals which exceeds its corresponding limit value.

6. Vehicle position determining apparatus according to claim 5 which includes means for using zero change of heading data for calculating said new vehicle position if both said first and second indicative signals exceed their corresponding limit values.

7. Vehicle position determining apparatus according to claim 2 which includes a compass and wherein said lateral acceleration first indicative signal is indicative of said lateral acceleration of said vehicle and is provided as a function of change of heading data provided by said compass.

8. Vehicle position determining apparatus according to claim 1 wherein said time corresponds to elapsed time during which said vehicle travels a fixed predetermined distance interval.

9. Vehicle position determining apparatus according to claim 1 wherein said other change of heading value is zero.

10. Vehicle position determining apparatus according to claim 1 wherein said first indicative signal is indicative of said lateral acceleration of said vehicle.

11. Vehicle position determining apparatus according to claim 1 wherein said first indicative signal is indicative of said rate of turn of said vehicle.

12. Vehicle position determining apparatus according to claim 1 wherein said calculating means effectively ignores said sensed change in heading in calculating said vehicle position if said first indicative signal exceeds said limit value.

13. Vehicle position determining apparatus comprising a dead reckoning position system including:
   differential wheel sensing apparatus for determining a sensed change in vehicle heading ($\Delta Hod$) by sensing the difference in travel between two different wheels of a vehicle;
   means mounted on said vehicle for calculating said vehicle's new position and heading by using the vehicle's prior position and prior directional heading and calculating said new vehicle position and heading based on sensed distance traveled ($\Delta D$ and said sensed change in heading ($\Delta Hod$) over a time ($\Delta t$);
   means for providing vehicle navigation/position information based on said calculated new position;

means for providing a first indicative signal which varies in accordance with a time rate of change of said sensed change in vehicle heading during said time, means for comparing said first indicative signal with a predetermined first limit value, and wherein said calculating means includes means for calculating said new vehicle position based on said sensed distance traveled and sensed change in heading ($\Delta$Hod) over said time if said first indicative signal is less than said limit value, otherwise calculating said new vehicle position using a change of heading value other than said sensed change of heading ($\Delta$Hod).

14. Vehicle position determining apparatus according to claim 13 wherein said limit value corresponds to an excessive magnitude of said first indicative signal indicative of improbable movement by said vehicle during normal operation.

15. Vehicle position determining apparatus according to claim 14 wherein said other change of heading value is zero.

16. Vehicle position determining apparatus according to claim 15 wherein said first indicative signal is indicative of vehicle lateral acceleration and is provided by means which utilizes said sensed change of heading provided by said differential wheel sensing apparatus to provide said first indicative signal.

17. Vehicle position determining apparatus according to claim 16 which includes a compass for sensing heading of said vehicle, and means for providing a second lateral acceleration indicative signal by using sensed changed of heading data ($\Delta$Hc) provided by said compass.

18. Vehicle position determining apparatus according to claim 17 which includes means for comparing said second lateral acceleration signal to a second limit value and means for effectively minimally weighting said sensed change of heading data, for use in vehicle position calculations, provided by said compass or said differential wheel sensing apparatus if said change of heading data results in a corresponding one of said lateral acceleration indicative signals which exceeds its corresponding limit value.

19. Vehicle position determining apparatus according to claim 13 wherein said calculating means effectively ignores said sensed change in heading in calculating said vehicle position if said first indicative signal exceeds said limit value.

20. Vehicle position determining apparatus comprising a dead reckoning position system including:

differential wheel sensing apparatus for determining a sensed change in vehicle heading ($\Delta$Hod) by sensing the difference in travel between two different wheels of a vehicle;

means mounted on said vehicle for calculating said vehicle's new position and heading by using the vehicle's prior position and prior directional heading and calculating said new vehicle position and heading based on sensed distance traveled ($\Delta$d) and said sensed change in heading ($\Delta$Hod) over a time ($\Delta$t);

means for providing vehicle navigation/position information based on said calculated new position;

means for providing a first signal indicative of at least one of the quantities of sensed vehicle rate of turn and sensed vehicle lateral acceleration during said time by using said sensed change in heading ($\Delta$Hod), means for comparing said first indicative signal with a predetermined limit value, and wherein said calculating means includes means for calculating said new vehicle position based on said sensed distance traveled and said sensed change in heading ($\Delta$Hod) over said time in accordance with a predetermined criteria if said first indicative signal is less than said limit value, otherwise calculating said new vehicle position using another predetermined criteria.

* * * * *